United States Patent [19]
Inoue

[11] Patent Number: 6,142,871
[45] Date of Patent: Nov. 7, 2000

[54] APPARATUS, METHOD AND RECORDED PROGRAMMED MEDIUM FOR SIMULATING DRIVING USING MIRRORS DISPLAYED IN A GAME SPACE

[75] Inventor: Yoshihisa Inoue, Tatsuno, Japan

[73] Assignee: Konami Co., Ltd., Hyogo-ken, Japan

[21] Appl. No.: 08/901,725

[22] Filed: Jul. 28, 1997

[30] Foreign Application Priority Data

Jul. 31, 1996 [JP] Japan ................................. 8-202162

[51] Int. Cl.[7] .................................................. A63F 9/24
[52] U.S. Cl. .................................................... 463/6
[58] Field of Search ................................ 463/6, 58, 59, 463/60, 62; 434/61, 62, 63, 64, 68, 69, 307 R; 273/459, 460, 461, 246

[56] References Cited

U.S. PATENT DOCUMENTS

| | | | |
|---|---|---|---|
| 4,313,726 | 2/1982 | Chase | 434/42 |
| 5,184,956 | 2/1993 | Langlais et al. | 434/69 |
| 5,269,687 | 12/1993 | Mott et al. | |
| 5,415,550 | 5/1995 | Aoki et al. | |

FOREIGN PATENT DOCUMENTS 787516 8/1997 European Pat. Off. .

OTHER PUBLICATIONS

Patent Abstracts Of Japan, vol. 095, No. 008, Sep. 29, 1995 & JP 07 116342 A (Sega Enterp Ltd) May 9, 1995.

*Primary Examiner*—Valencia Martin-Wallace
*Assistant Examiner*—John Paradiso
*Attorney, Agent, or Firm*—Jordan and Hamburg LLP

[57] ABSTRACT

An image display processor displays a three-dimensional image within a visible range of a player's automobile on a display monitor depending on the position and direction of the player's automobile which is controlled by a player's automobile control unit. A mirror display processor determines whether a displayed mirror is within the visible range of the player's automobile or not based on the position and direction of the player's automobile. When the mirror is within the visible range of the player's automobile, the mirror display processor generates a reflected image. The image display processor then horizontally inverts the generated image, and displays the horizontally inverted image in superposed relation to the displayed mirror.

11 Claims, 14 Drawing Sheets

APPARATUS, METHOD AND RECORDED PROGRAMMED MEDIUM FOR SIMULATING DRIVING USING MIRRORS DISPLAYED IN A GAME SPACE

BACKGROUND OF THE INVENTION

1. Field of the Invention

The present invention relates to a driving game machine for displaying in real-time a three-dimensional image of a simulated automobile and a surrounding scene on a display monitor while the three-dimensional image is changing as the simulated automobile is driven by the game player, a method of displaying a three-dimensional image on a display monitor in a driving game machine, and a recording medium which stores a driving game program for displaying a three-dimensional image on a display monitor in a driving game machine.

2. Description of the Prior Art

There have heretofore been in widespread use driving game machines having a display monitor for displaying a three-dimensional image of a simulated automobile and a surrounding scene and a game player's seat resembling the driver's seat of an automobile and associated with a steering wheel, an accelerator pedal, a brake pedal, and other control buttons. The game player of such a driving game machine sits in the game player's seat and drives the simulated automobile displayed on the display monitor while seeing the three-dimensional image as it changes upon driving of the simulated automobile. The display monitor displays, in addition to the simulated automobile driven by the game player, other automobiles including a rival automobile which competes with the player's automobile and general automobiles which serve merely as obstacles. The game player drives the player's automobile to run fast on a three-dimensional circuit road that includes bends and ups and downs, trying to overtake the other automobiles on the three-dimensional circuit road.

One problem with the conventional driving game machines is that they do not display a mirror at a bend of the three-dimensional circuit road on the display monitor. Therefore, when the player's automobile is positioned before or in a bend or until the player's automobile runs past a bend, the game player is unable to recognize whether other automobiles are running beyond the bend or not.

SUMMARY OF THE INVENTION

It is therefore an object of the present invention to provide a driving game machine which displays a three-dimensional image of a simulated automobile and a surrounding scene on a display monitor, the three-dimensional image including a mirror at a bend of a three-dimensional circuit road together with a reflected image in the mirror.

Another object of the present invention to provide a method of displaying a three-dimensional image of a simulated automobile and a surrounding scene on a display monitor of a driving game machine, the three-dimensional image including a mirror at a bend of a three-dimensional circuit road together with a reflected image in the mirror.

Still another object of the present invention to provide a recording medium which stores a driving game program for displaying a three-dimensional image of a simulated automobile and a surrounding scene on a display monitor of a driving game machine, the three-dimensional image including a mirror at a bend of a three-dimensional circuit road together with a reflected image in the mirror.

According to the present invention, there is provided a driving game machine comprising image display processing means for displaying on a display monitor a real-time three-dimensional image which varies as a simulated player's automobile runs on a three-dimensional road established in a three-dimensional coordinate system in a game space, driving control means operable by a game player for instructing the player's automobile to run on the three-dimensional road, player's automobile control means for controlling the player's automobile to run on the three-dimensional road in response to instructions from the driving control means, mirror coordinate data memory means for storing coordinate data of a mirror established in the three-dimensional coordinate system and displayed near the three-dimensional road on the display monitor, and mirror display processing means for displaying the mirror in a visible range of the player's automobile displayed on the display monitor based on the coordinate data stored by the mirror coordinate data memory means, the mirror display processing means comprising player's automobile coordinate determining means for determining coordinate data of the player's automobile controlled by the player's automobile control means, line-of-sight calculating means for calculating the direction of a line of sight from a viewpoint of the player's automobile toward the mirror based on the coordinate data of the mirror and the coordinate data of the player's automobile, distance calculating means for calculating a distance from the player's automobile to the mirror based on the coordinate data of the mirror and the coordinate data of the player's automobile, reflected line-of-sight calculating means for calculating the direction of a reflected line of sight from the mirror based on an angle between a reflecting surface of the mirror obtained from coordinate data of the mirror and the direction of the line of sight, mirror viewpoint coordinate calculating means for calculating coordinates of a viewpoint of the mirror which is spaced the distance from the mirror in a direction opposite to the direction of the reflected line of sight, an angle-of-view calculating means for calculating a size of the mirror displayed on the display monitor based on the coordinate data of the mirror and the coordinate data of the player's automobile, and then calculating an angle of view of the mirror as viewed from the viewpoint of the player's automobile based on the calculated size of the mirror, and image generating means for generating an image within the angle of view as viewed from the viewpoint of the mirror in the direction of the reflected line of sight over at most the distance, the image display processing means comprising means for horizontally inverting the image generated by the image generating means and displaying the horizontally inverted image in superposed relation to the mirror.

With the above arrangement, the player's automobile is driven on the three-dimensional road established in the three-dimensional coordinate system in the game space under the control of the driving control means operated by the game player, and an image of the three-dimensional road is displayed in the visible range of the player's automobile on the display monitor. Coordinate data of the player's automobile controlled by the player's automobile control means are determined, and the direction of the line of sight from the viewpoint of the player's automobile toward the mirror and the distance from the player's automobile toward the mirror are calculated on the basis of the coordinate data of the mirror and the coordinate data of the player's automobile. Using an angle between the calculated direction of the line of sight and the reflecting surface of the mirror, the direction of the reflected line of sight from the mirror is calculated, and coordinates of the mirror viewpoint which is spaced the distance from the mirror in the direction opposite to the direction of the reflected line of sight are calculated. Based on the coordinate data of the mirror and the coordinate data of the player's automobile, the size of the mirror displayed on the display monitor is calculated. Then, an angle of view of the mirror as viewed from the viewpoint of the player's automobile is calculated based on the calculated size of the mirror. Thereafter, an image within the angle of view as viewed from the viewpoint of the mirror in the direction of the reflected line of sight over at most the distance is generated, and the generated image is horizontally inverted and displayed in superposed relation to the mirror. In this manner, the reflected image in the mirror is easily generated in a short period of time, allowing the game player to operate the driving control means while seeing the reflected image in the mirror. The game player thus finds the driving game highly realistic and interesting to play.

The angle-of-view calculating means comprises means for calculating in a two-dimensional coordinate system the size of the mirror displayed on the display monitor based on two-dimensional coordinates obtained from the coordinate data of the mirror and the coordinate data of the player's automobile, and then calculating in the two-dimensional coordinate system the angle of view of the mirror as viewed from the viewpoint of the player's automobile based on the calculated size of the mirror.

The angle-of-view calculating means thus arranged makes it possible to calculate the size and angle of view of the mirror displayed on the display monitor with ease in a shorter period of time.

The driving game machine further comprises general automobile control means for controlling a plurality of general automobiles to run on the straight road, the three-dimensional road having a running lane and an oncoming lane for the player's and general automobiles to run therealong, the image display processing means comprising means for displaying general automobiles to run in the running lane in the same direction as the player's automobile and general automobiles to run in the oncoming lane in a direction opposite to the player's automobile.

General automobiles run on the running and oncoming lanes of the three-dimensional road. Depending on how the driving control means is operated by the game player, the player's automobile runs on the running lane or the oncoming lane, and the three-dimensional image in the visible range of the player's automobile, which includes general automobiles on the running and oncoming lanes as they vary depending on the running of the player's automobile, is displayed on the display monitor. The game player operates the driving control means to maneuver the player's automobile to run past general automobiles on the running lane, and to run to avoid a collision with general automobiles on the oncoming lane. The game player can also take a preventive action to avoid a collision with a general automobile on the oncoming lane beyond a bend of the road by seeing a reflected image displayed in the mirror. Therefore, the game player finds it highly exciting to play the driving game on the driving game machine.

According to the present invention, there is also provided a recording medium storing a driving game program for enabling a computer to drive a simulated player's automobile on a three-dimensional road established in a three-dimensional coordinate system in a game space as instructed by a game player, wherein the driving game program as executed by the computer includes the steps of displaying a real-time three-dimensional image in a visible range of the player's automobile on a display monitor, the three-dimensional image including a mirror positioned near the three-dimensional road and established in the three-dimensional coordinate system, and being variable as the player's automobile is driven, and displaying a reflected image in the mirror in superposed relation to the mirror, the step of displaying the reflected image comprising the steps of determining coordinate data of the player's automobile, calculating the direction of a line of sight from a viewpoint of the player's automobile toward the mirror based on the coordinate data of the mirror and the coordinate data of the player's automobile in the three-dimensional coordinate system, calculating a distance from the player's automobile to the mirror based on the coordinate data of the mirror and the coordinate data of the player's automobile, calculating the direction of a reflected line of sight from the mirror based on an angle between a reflecting surface of the mirror obtained from coordinate data of the mirror and the direction of the line of sight, calculating coordinates of a viewpoint of the mirror which is spaced the distance from the mirror in a direction opposite to the direction of the reflected line of sight, calculating a size of the mirror displayed on the display monitor based on the coordinate data of the mirror and the coordinate data of the player's automobile, and then calculating an angle of view of the mirror as viewed from the viewpoint of the player's automobile based on the calculated size of the mirror, and generating an image within the angle of view as viewed from the viewpoint of the mirror in the direction of the reflected line of sight over at most the distance, the step of displaying the three-dimensional image comprising the step of horizontally inverting the image generated within the angle of view and displaying the horizontally inverted image in superposed relation to the mirror.

The driving game program stored in the recording medium generates a reflected image in the mirror easily in a short period of time, and also allows the game player to operate a driving control assembly while seeing the reflected image on the mirror. The recording medium may comprise a removable recording medium such as a CD-ROM, an optical disk, a memory card, a floppy disk, or the like for replacing or updating the driving game program.

According to the present invention, there is further provided a method of displaying a three-dimensional image in a driving game machine, comprising the steps of displaying a real-time three-dimensional image which varies as a simulated player's automobile runs on a three-dimensional road established in a three-dimensional coordinate system in a game space, calculating the direction of a line of sight from a viewpoint of the player's automobile toward a mirror positioned near the three-dimensional road and established in the three-dimensional coordinate system, based on coordinate data of the mirror and coordinate data of the player's automobile in the three-dimensional coordinate system, calculating a distance from the player's automobile to the mirror based on the coordinate data of the mirror and the coordinate data of the player's automobile, calculating the direction of a reflected line of sight from the mirror based on an angle between a reflecting surface of the mirror obtained from coordinate data of the mirror and the direction of the line of sight, calculating coordinates of a viewpoint of the mirror which is spaced the distance from the mirror in a direction opposite to the direction of the reflected line of sight, calculating a size of the mirror displayed on the display monitor based on the coordinate data of the mirror and the coordinate data of the player's automobile, and then calculating an angle of view of the mirror as viewed from the viewpoint of the player's automobile based on the calculated size of the mirror, and generating an image within the angle of view as viewed from the viewpoint of the mirror in the direction of the reflected line of sight over at most the distance, the step of displaying the real-time three-dimensional image comprising the steps of displaying the mirror in a visible range of the player's automobile displayed on the display monitor, horizontally inverting the image generated within the angle of view, displaying the horizontally inverted image in superposed relation to the mirror.

According to the present invention, there is also provided a driving game machine for displaying a real-time image which varies as a simulated player's automobile runs on a road in a game space, comprising virtual-image-position calculating means for calculating the position of a virtual image of the player's automobile which is produced by a mirror positioned near the road, image generating means for generating an image in a range of view of the mirror as viewed from the position of the virtual image of the player's automobile, and image display processing means for displaying an image which is horizontally inverted from the image generated by the image generating means, over the mirror in the real-time image.

The above and other objects, features, and advantages of the present invention will become apparent from the following description when taken in conjunction with the accompanying drawings which illustrate a preferred embodiment of the present invention by way of example.

BRIEF DESCRIPTION OF THE DRAWINGS

FIG. 3(*b*) is a view of the circuit road and the mirror which are displayed on a display monitor.

DETAILED DESCRIPTION OF THE PREFERRED EMBODIMENT

Figure 1:
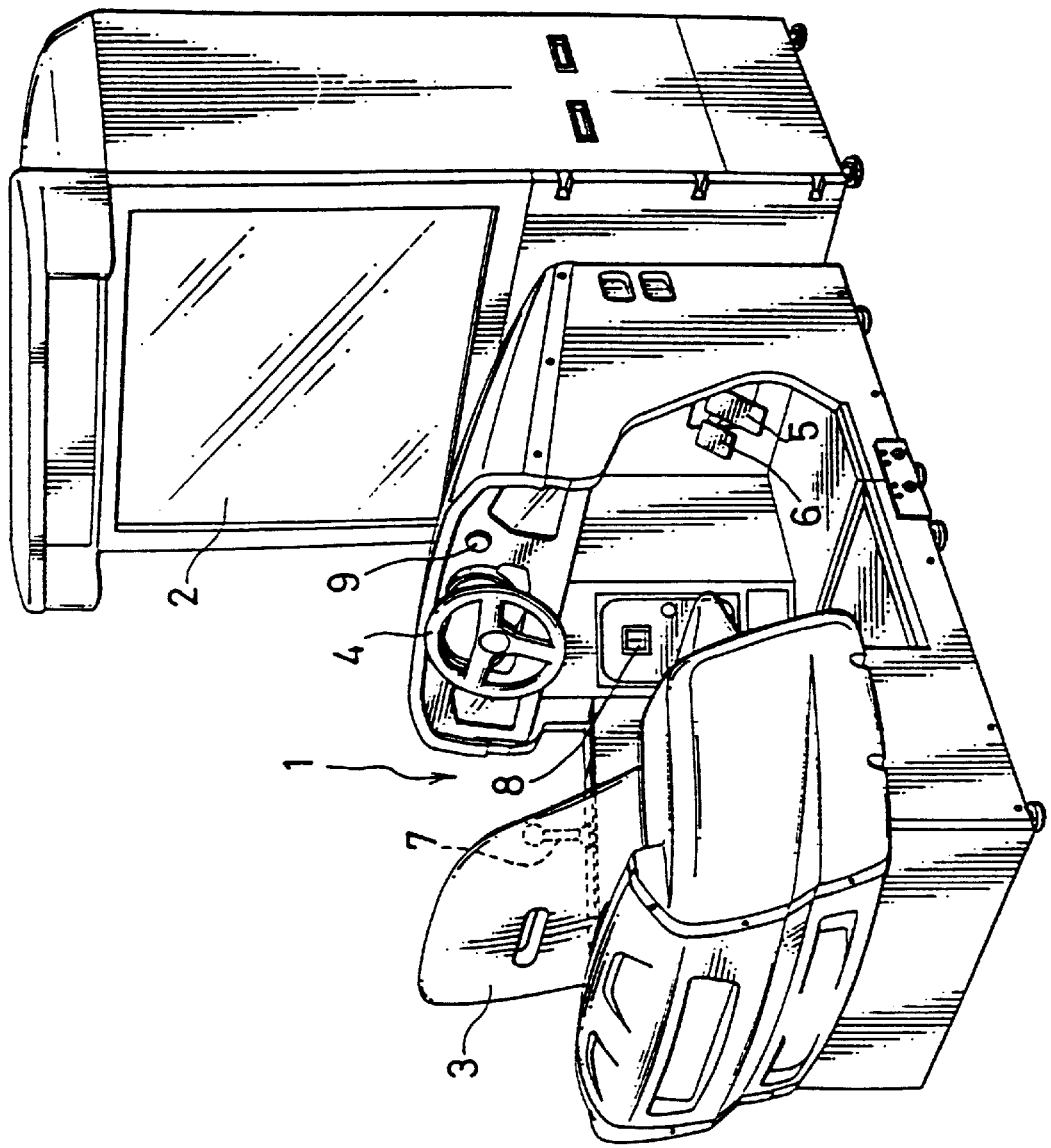
FIG. 1 is a perspective view of a driving game machine according to the present invention.

As shown in FIG. 1, a driving game machine according to the present invention generally comprises a cockpit 1 and a display monitor 2. The cockpit 1 has a driver's seat 3, a steering wheel 4, an accelerator pedal 5, a brake pedal 6, and a gear change lever 7, similar to the driver's seat of an actual automobile. The cockpit 1 also has a coin insertion slot 8 for inserting a coin therethrough, positioned in front of the left-hand side of the driver's seat 3, and a start switch 9 for starting a driving game, positioned on the right-hand side of the steering wheel 4. The display monitor 2 is located in front of the cockpit 1 at a position that can easily be viewed by the game player who is seated on the driver's seat 3. The display monitor 2 may comprise a CRT (cathode-ray tube), an LCD (liquid crystal display), a projector, or the like for displaying images thereon.

Coordinate systems used in an image processing process for a driving game played on the driving game machine and a summary of such a driving game are described below with reference to FIGS. 2 through 4.

Figure 2:
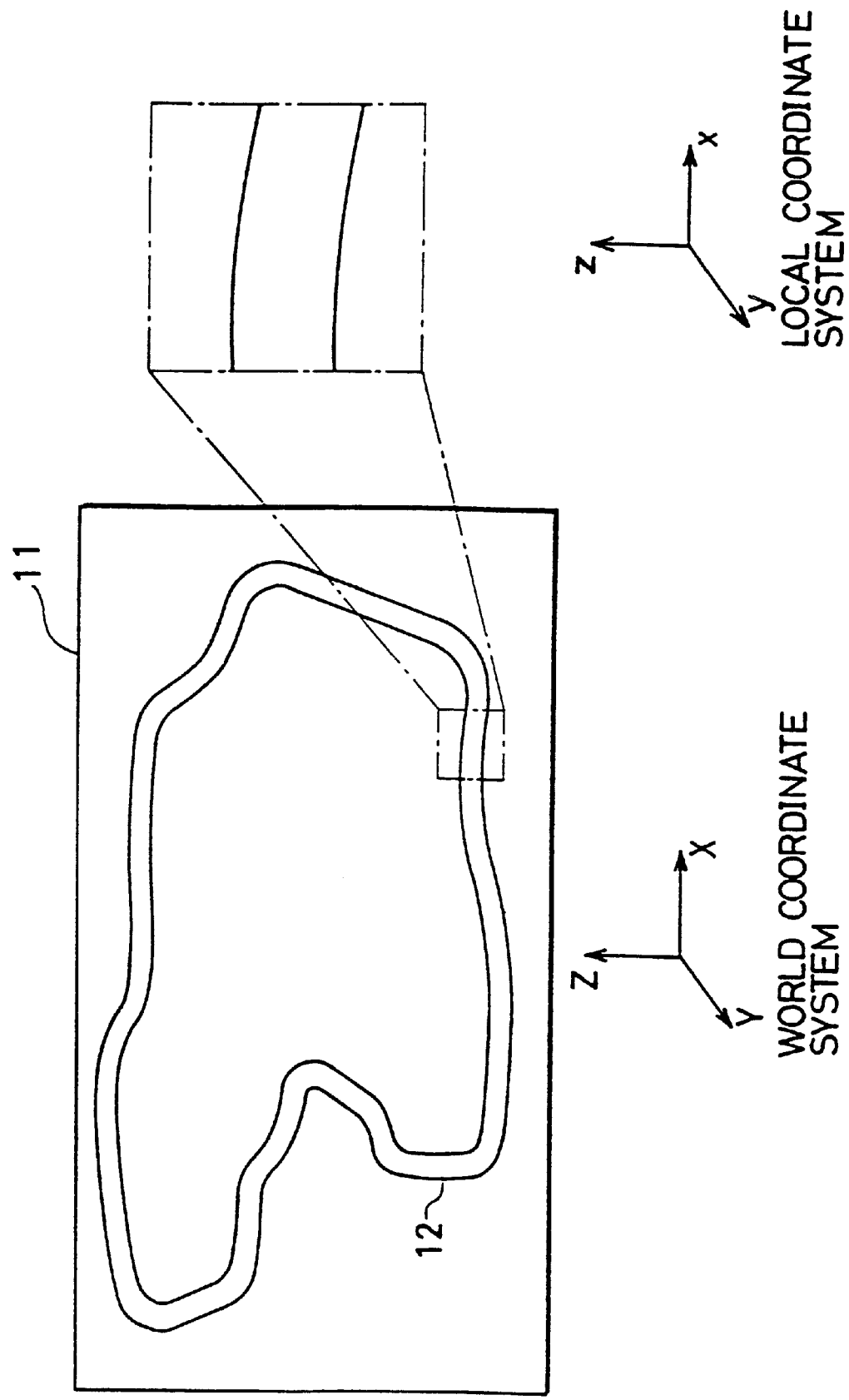
FIG. 2 is a diagram showing a field of a driving game played on the driving game machine.
Figure 3A:
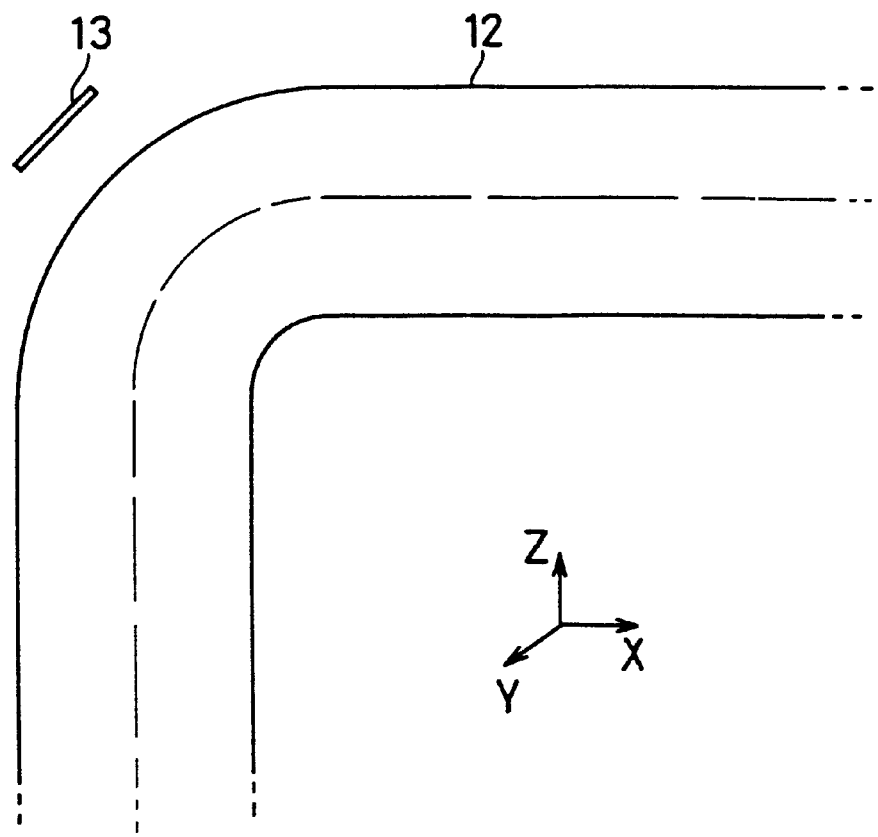
FIG. 3(*a*) is a plan view showing a circuit road with a mirror positioned at a bend thereof.
Figure 3B:
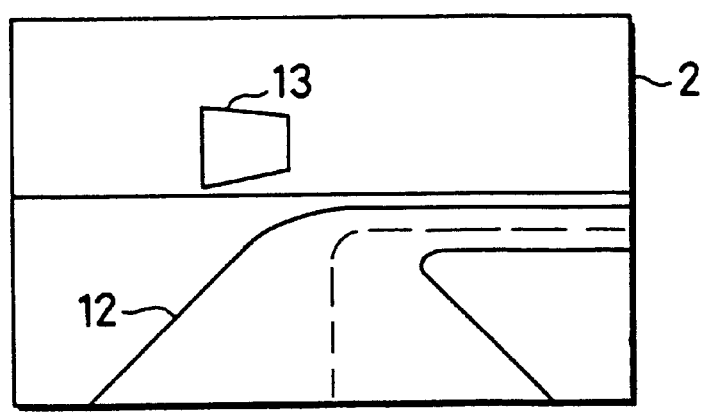

FIG. 2 schematically shows a field 11 of a driving game played on the driving game machine. The field 11 shown in FIG. 2 represents an entire space that is expressed by a computer graphic image, and includes a circuit road 12 extending substantially along peripheral edges of the field 11 and models (not shown) of buildings and other objects placed along the circuit road 12. One of the models is a mirror 13 (see FIGS. 3(*a*) and 3(*b*)) located outwardly of a bend of the circuit road 12. FIG. 4 fragmentarily shows the circuit road 12. As shown in FIG. 4, the circuit road 12 has a start point and is divided into road models (1) through (19) spaced by respective distances from the start point.

FIG. 2 also shows a three-dimensional world coordinate system (X, Y, Z) which is established in the field 11 in its entirety, and a three-dimensional local coordinate system (x, y, z) which is established in a partial space in the field 11. The shape information of each of the models of buildings and other objects, including the mirror 13, is described using the three-dimensional world coordinate system (X, Y, Z). The shape information of each of the road models (1) through (19) is described using its own inherent local coordinate system (x, y, z).

Figure 5:
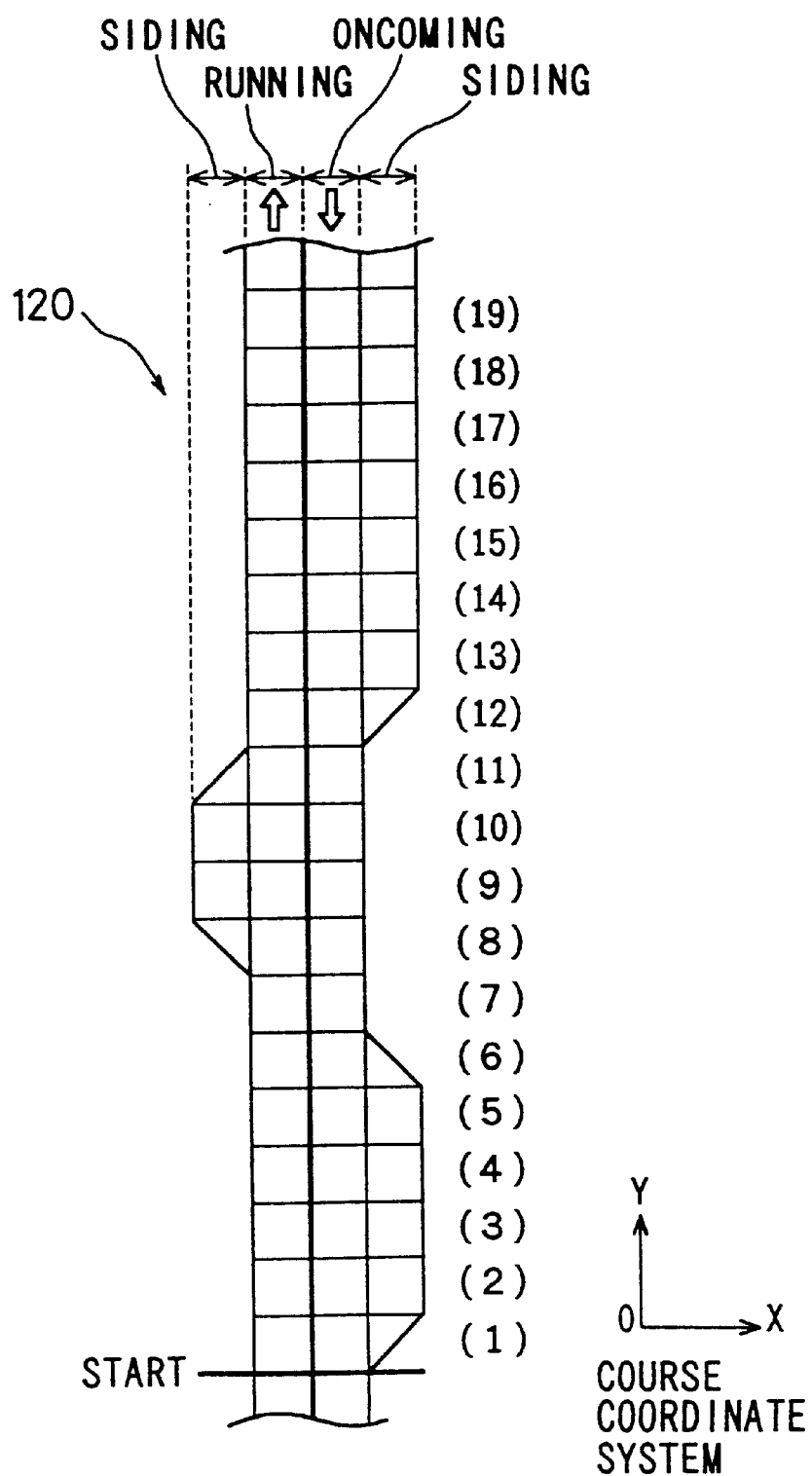
FIG. 5 is a diagram showing a hypothetical straight road that is converted from the circuit road along a center line thereof.

FIG. 5 illustrates a hypothetical straight road 120 that is converted from the circuit road 12 along a center line thereof. A two-dimensional course coordinate system (x, y) shown in FIG. 5 is established on the straight road 120. The two-dimensional course coordinate system (x, y) has y coordinates which represent distances along the straight road 120 from the start point, and x coordinates which represent transverse positions across the straight road 120.

Figure 4:
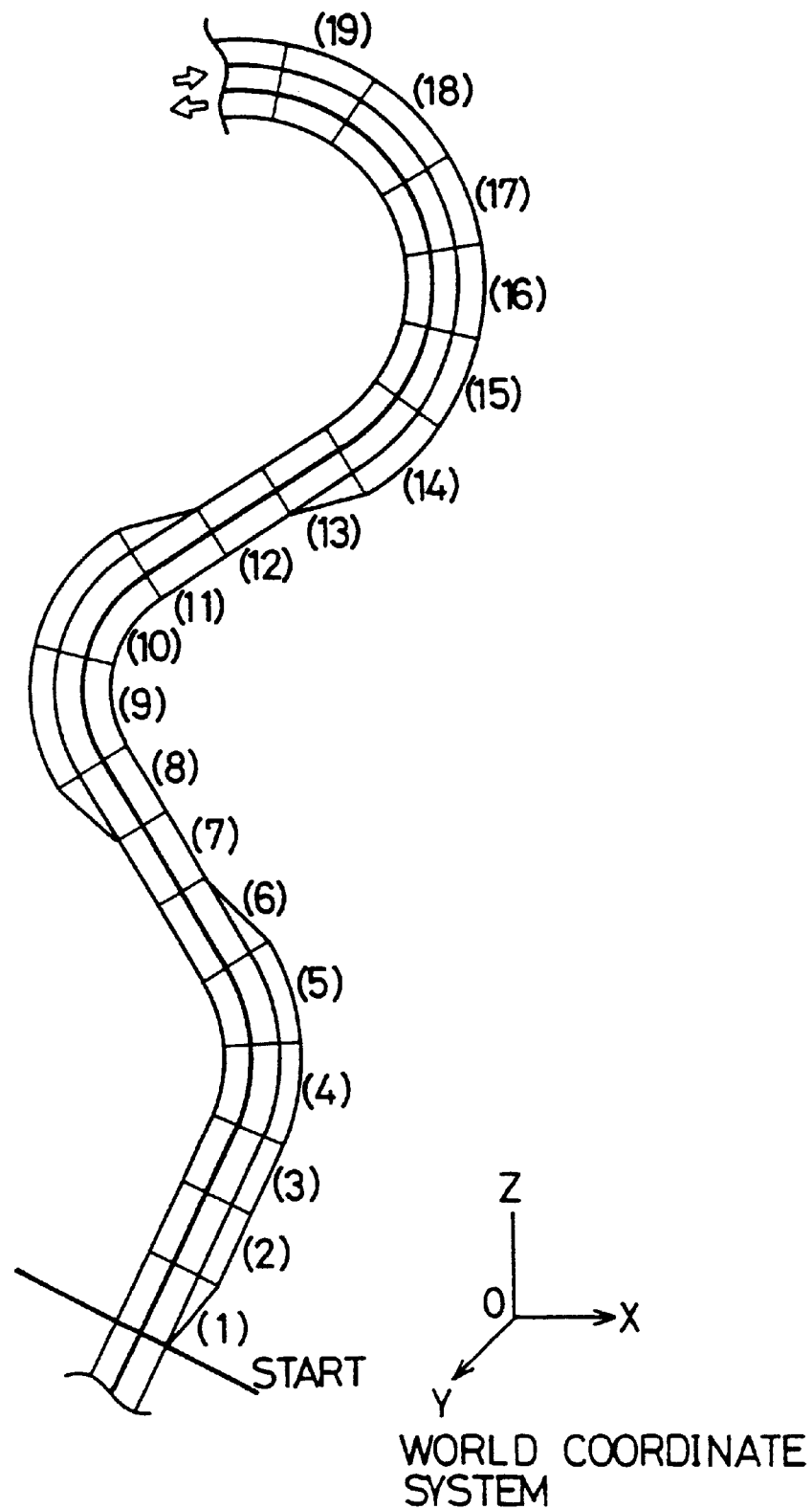
FIG. 4 is a diagram showing a portion of a circuit road which is divided into road models.

As shown in FIGS. 4 and 5, the straight road 120, i.e., the circuit road 12, has two lanes, i.e., a running lane and an oncoming lane. Some of the road models of the circuit road 12 have a siding lane outside of the running lane or the oncoming lane. Specifically, each of the road models (1), . . . , (6) and the road models (13), . . . , (19), . . . has a siding lane outside of the oncoming lane, and each of the road models (8), . . . , (11) has a siding lane outside of the running lane.

As shown in FIG. 4, the siding lanes have their beginning at the respective road models (1), (8), (13) and are progressively wider at these road models in a direction away from the start point, and their end at the respective road models (6), (11) and are progressively narrower at these road models in the direction away from the start point.

In a driving game played on the driving game machine by the game player sitting in the cockpit 1, the game player controls the steering wheel 4, the accelerator pedal 5, the brake pedal 6, and the gear change lever 7, trying to drive the player's automobile displayed on the display monitor 2, while passing general automobiles displayed on the display monitor 2 running on the running lane, as fast as possible on the running lane, the oncoming lane, or the siding lane of circuit road 12 without getting into collision with road edges and general automobiles running as obstacles on the running lane and the oncoming lane. The general automobiles running on the running lane and the oncoming lane of the circuit road 12 are controlled to run along the centers of the lanes by the driving game machine. There are several tens of general automobiles established by the driving game machine. Depending on the position and direction of the player's automobile, the models of buildings and other objects along the circuit road 12 and the general automobiles, which are positioned within a visible range from the cockpit 1, are displayed on the display monitor 2. When the mirror 13 at a bend of the circuit road 12 is located within the visible range from the cockpit 1, an image reflected by the mirror 13 is displayed in superposed relation to the mirror 13 according to a procedure to be described below.

Since the circuit road 12 of the driving game played on the driving game machine includes the oncoming lane on which general automobiles run and allows the player's automobile to run on the oncoming lane as well as on the running lane, the game player can have a thrilling and realistic experience driving the player's automobile while avoiding general automobiles on the coming lane.

The circuit road 12 also includes the siding lane on which the player's automobile can run. Therefore, the game player can drive the player's automobile at high speeds using the siding lane. Inasmuch as the game player is psychologically forced to return the player's automobile from the siding lane to the running lane or the oncoming lane when the end of the siding lane is reached, the game player will find the driving game complex and full of fun.

The display monitor 2 also displays an image reflected by the mirror 13 at the bend in superposed relation to the mirror 13. Therefore, the game player can visually recognize a general automobile or automobiles on the oncoming lane beyond the bend of the circuit road 12, and can control the player's automobile in advance to avoid the recognized general automobile or automobiles prior to reaching the bend. Accordingly, the reflected image displayed over the mirror 2 makes the driving game highly realistic and sophisticated when it is played on the driving game machine.

Figure 6:
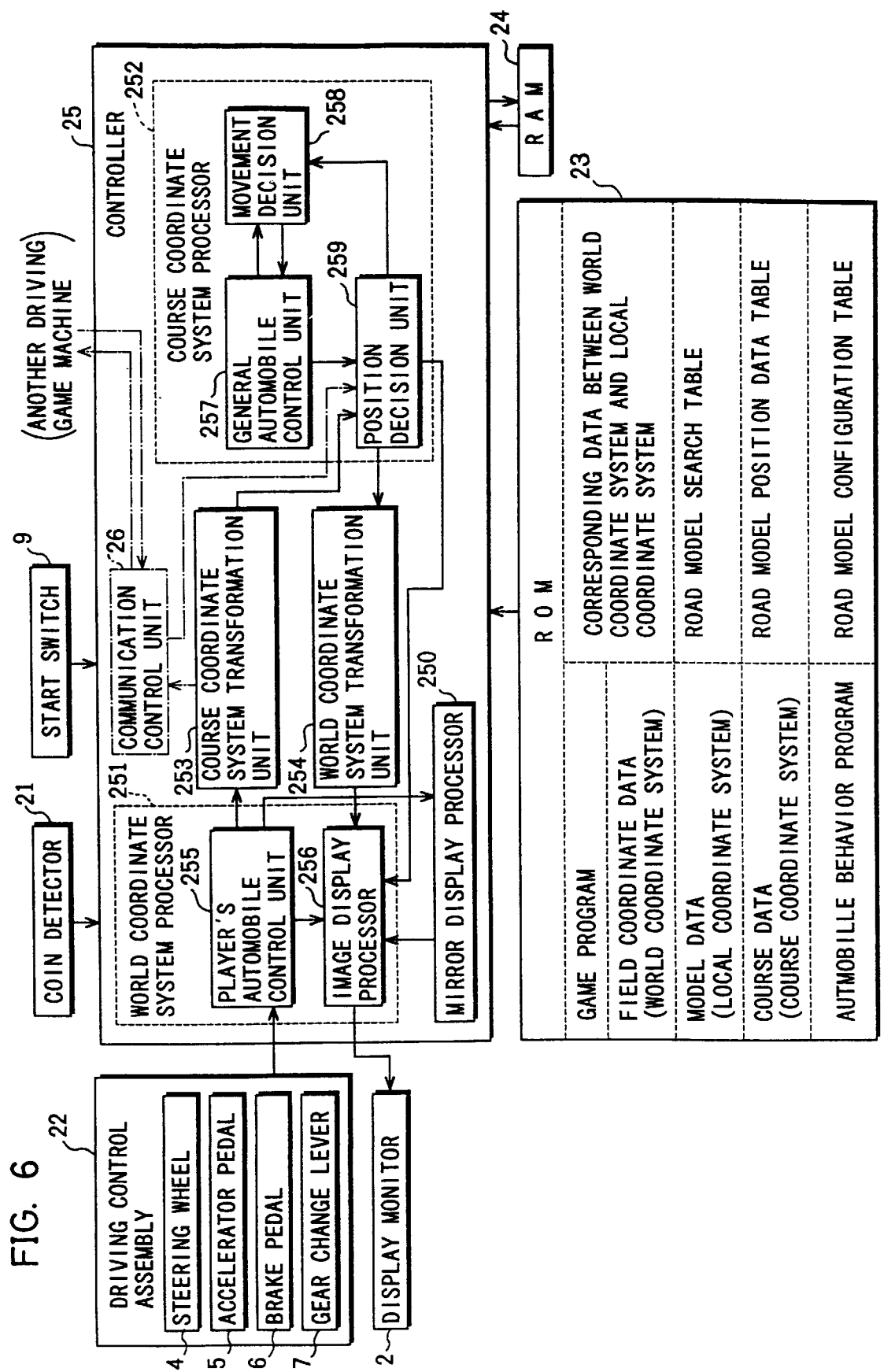
FIG. 6 is a block diagram of a control system of the driving game machine.

FIG. 6 shows in block form a control system of the driving game machine according to the present invention.

As shown in FIG. 6, the control system basically comprises the display monitor 2, the start switch 9, a coin detector 21, a driving control assembly 22, a ROM (read-only memory) 23, a RAM (random-access memory) 24, and a controller 25.

When the start switch 9 is pressed by the game player, the start switch 9 issues a switch signal to the controller 25. When the coin detector 21 detects a coin inserted through the coin insertion slot 8 (see FIG. 1), it outputs a coin-detected signal to the controller 25.

The driving control assembly 22 comprises the steering wheel 4, the accelerator pedal 5, the brake pedal 6, and the gear change lever 7. The driving control assembly 22 supplies various control data, representing an angular displacement of the steering wheel 4, depths to which the accelerator pedal 5 and the brake pedal 6 are depressed, and a gear position selected by the gear change lever 7, to the controller 25 where they are inputted to a player's automobile control unit 255 (described below).

The ROM 23 stores a program of the driving game, coordinate data of the field and models in the world coordinate system (X, Y, Z), coordinate data of the road models in the local coordinate system (x, y, z), course data in the course coordinate system (x, y), a program for determining automobile behaviors according to the automobile engineering, data indicative of the correspondence between the world coordinate system (X, Y, Z) and the local coordinate system (x, y, z), and table data shown in Tables 1 through 3, described below. The RAM 24 serves to temporarily store various data.

The controller 25 comprises a CPU (central processing unit), logic circuits, and other circuit elements for controlling operation of the driving game machine. The controller 25 determines whether a coin is inserted into the coin insertion slot 8 or not based on the signal from the coin detector 21, and also determines whether the start switch 9 is pressed by the game player or not based on the signal from the start switch 9.

The controller 25 has a world coordinate system processor 251, a course coordinate system processor 252, a course coordinate system transformation unit 253, a world coordinate system transformation unit 254, and a mirror display processor 250.

The world coordinate system processor 251, which carries out control in the world coordinate system (X, Y, Z), has a player's automobile control unit 255 and an image display processor 256. The course coordinate system processor 252, which carries out control in the local coordinate system (x, y, z), has a general automobile control unit 257, a movement decision unit 258, and a position decision unit 259.

The player's automobile control unit 255 controls the running of the player's automobile based on the various control data supplied from the driving control assembly 22 according to the program, stored in the ROM 23, relative to automobile behaviors according to automobile engineering. The course coordinate system transformation unit 253 transforms the coordinate data relative to the position of the player's automobile that is being controlled in the world coordinate system (X, Y, Z) into coordinate data in the course coordinate system (x, y).

The general automobile control unit 257 controls the running of general automobiles on the straight road 120 (see FIG. 5) in the course coordinate system (x, y) under preset conditions with respect to speeds, accelerations, decelerations, etc. The general automobile control unit 257 controls general automobiles to run along the centers of the lanes.

The general automobile control unit 257 controls a given number of general automobiles within a preset range over a distance L forward and backward of the player's automobile. The general automobile control unit 257 compares the total number "n" of general automobiles, which varies depending on the running of the player's automobile, and a predetermined value "N", and introduces a new general automobile into the above preset range if n<N. The general automobile control unit 257 determines a lane into which to introduce a new general automobile in order to have the ratio $r=n_2/n_1$ approach a predetermined value "R" where $n_1$ is the number of general automobiles on the running lane and $n_2$ is the number of general automobiles on the oncoming lane. Specifically, the general automobile control unit 257 introduces a new general automobile into the running lane if $r \geq R$ and into the oncoming lane if r<R.

Since y coordinates in the course coordinate system (x, y) represent distances traveled by the general automobiles along the straight road 120, the general automobile control unit 257 can easily determine the positions of the general automobiles on the running lane by adding the product of (sampling interval)×(running speed) to the present y coordinates, and the positions of the general automobiles on the oncoming lane by subtracting the product of (sampling interval)×(running speed) from the present y coordinates.

The position decision unit 259 determines the positional relation between the player's automobile and the general automobiles for a contact, a collision, etc., the positional relation between the general automobiles, and the positional relation between the player's automobile and road edges, and also determines general automobiles which are positioned in a predetermined visible range of the player's automobile. The position decision unit 259 uses the coordinate data transformed by the course coordinate system transformation unit 253 as the positional coordinate data of the player's automobile. The predetermined visible range of the player's automobile has been defined by left and right angles with respect to the direction in which the player's automobile travels, and a distance from the player's automobile.

When the position decision unit 259 determines a contact or collision between the player's automobile and a general automobile or between the player's automobile and a road edge, it delivers a collision signal to the image display processor 256.

Figure 7:
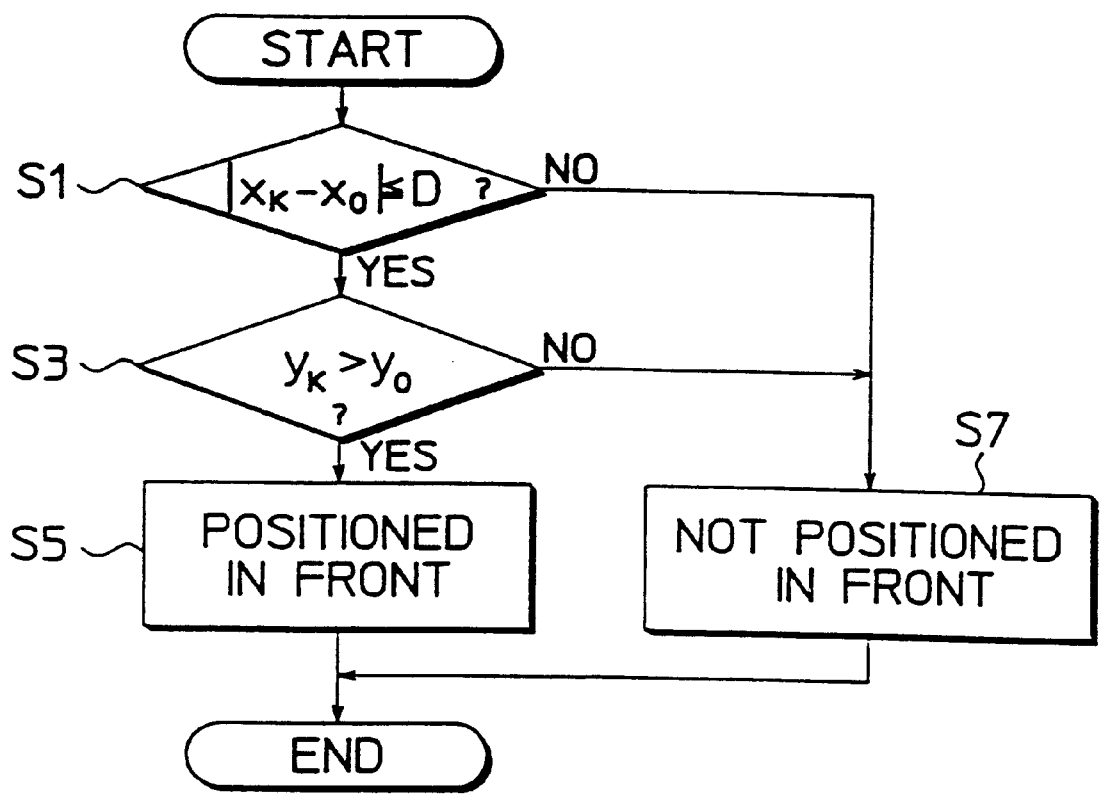
FIG. 7 is a flowchart of a sequence of making a movement decision.

The movement decision unit 258 determines whether the player's automobile or another general automobile exists in front of a general automobile which is under consideration for a movement decision, according to a process shown in FIG. 7, using the positional relation determined between the player's automobile and the general automobiles and also the positional relation between the general automobiles by the position decision unit 259. The results determined by the movement decision unit 258 are used by the general automobile control unit 257 to control the running of the general automobiles.

The world coordinate system transformation unit 254 transforms the positional coordinate data of general automobiles that are determined to be positioned in the visible range of the player's automobile by the position decision unit 259, from the course coordinate system (x, y) into the world coordinate system (X, Y, Z), according to a positional data transformation process, described below shown in FIG. 9.

The image display processor 256 displays the circuit road 12 (see FIG. 2) in the visible range of the player's automobile, the models of the buildings and other objects along the circuit road 12, and the general automobiles whose positional coordinate data have been transformed into the world coordinate system (X, Y, Z), on the display monitor 2 according to known three-dimensional image processing techniques including geometric and rendering processes, depending on the position and direction of the player's automobile which is controlled by the player's automobile control unit 255. When a collision signal is supplied from the position decision unit 259, the image display processor 256 displays a spinning or vibrating image on the display monitor 2.

The mirror display processor 250 determines whether the mirror 13 is present in the visible range of the player's automobile or not based on the position and direction of the player's automobile which is controlled by the player's automobile control unit 255 when the mirror 13 is present in the visible range of the player's automobile, the mirror display processor 250 generates a reflected image in the mirror 13.

When the mirror 13 is present in the visible range of the player's automobile, the image display processor 256 horizontally inverts the image generated by the mirror display processor 250 and displays the horizontally inverted image in superposed relation to the mirror 13.

Inasmuch as the position decision unit 259 determines the positional relation between the player's automobile and the general automobiles, the positional relation between the general automobiles, and the positional relation between the player's automobile and a road end, and also determines general automobiles which are positioned in the visible range of the player's automobile in the two-dimensional course coordinate system (x, y), the position decision unit 259 can easily and quickly determine those positional relations and general automobiles positioned in the visible range of the player's automobile. Although the width of the road on which automobiles can run varies due to the siding lanes, whether the player's automobile has contacted or collided with a road edge or not can quickly and easily be determined as such a determination is made simply by comparing x coordinates in the two-dimensional course coordinate system (x, y). Therefore, a siding layer can be established in any arbitrary position, making the driving game interesting to the player.

The general automobiles are controlled by the course coordinate system processor 252, and the positional coordinate data of only those general automobiles which are displayed on the display monitor 2 are transformed from the two-dimensional course coordinate system (x, y) into the three-dimensional world coordinate system (X, Y, Z). Therefore, the number of general automobiles that can be controlled can be increased without increasing the burden on the CPU of the controller 25. General automobiles on the oncoming lane which run in the opposite direction can easily be controlled. The increased number of general automobiles makes the driving game more interesting to the player, and also gives a more realistic look to three-dimensional images displayed on the display monitor 2.

A process of making a movement decision with the movement decision unit 258 is described below with reference to FIG. 7.

It is assumed that an automobile which is under consideration for a movement decision has coordinates $(x_0, y_0)$ in the course coordinate system (x, y), an automobile k which is not under consideration for a movement decision has coordinates $(x_k, y_k)$ in the course coordinate system (x, y), and each lane of the straight road 120 has a width D, where k is an integer ranging from 1–m, and that there are m general and player's automobiles which are not under consideration for a movement decision.

As shown in FIG. 7, the movement decision unit 258 determines whether or not the difference $x_k-x_0$ between the coordinates $x_k$, $x_0$ is equal to or smaller than the width D in a step S1. If the difference $X_k-x_0$ is equal to or smaller than the width D (YES in the step S1), then the movement decision unit 258 determines whether or not the coordinate $y_k$ is greater than the coordinate $y_0$ in a step S3. If the coordinate $y_k$ is greater than the coordinate $y_0$ (YES in the step S3), then the movement decision unit 258 decides that the automobile k is positioned in front of the automobile which is under consideration for a movement decision in a step S5.

If the difference $x_k-x_0$ is greater than the width D (NO in the step S1), then the automobile k is not positioned in the same lane as the automobile which is under consideration for a movement decision. If the coordinate $y_k$ is smaller than the coordinate $y_0$ (NO in the step S3), then the automobile k is not positioned in front of the automobile which is under consideration for a movement decision. In either case, the movement decision unit 258 decides that the automobile k is not positioned in front of the automobile which is under consideration for a movement decision in a step S7.

The above process is effected on other automobiles k (1–m) than the automobile which is under consideration for a movement decision, so that all automobiles positioned in front of the automobile which is under consideration for a movement decision can be ascertained.

Heretofore, the above process of making a movement decision is the most complex, and contains the largest number of processing steps, of all processes that make up the computerized control of the driving game. For driving a general automobile on the display monitor 2 under preset conditions with respect to a speed, etc., it is necessary to determine whether another automobile exists in front of the general automobile or not according to the above process of making a movement decision. If the positions of the automobiles were calculated using three-dimensional coordinate data and the positional relationship between the automobiles were determined and the above process of making a movement decision were carried out using the calculated positions for displaying a three-dimensional image, then the program of the driving game would be complex and contain a large number of processing steps.

However, according to the present invention, since the two-dimensional coordinate data in the course coordinate system are used by the movement decision unit 258, the above process of making a movement decision can be carried out easily as shown in FIG. 7. This allows many general automobiles, e.g., several tens of general automobiles, to be used in the driving game, making the driving game more fun to play than heretofore.

Operation of the driving game machine according to the present invention is described below with reference to FIGS. 8 through 10.

Figure 8:
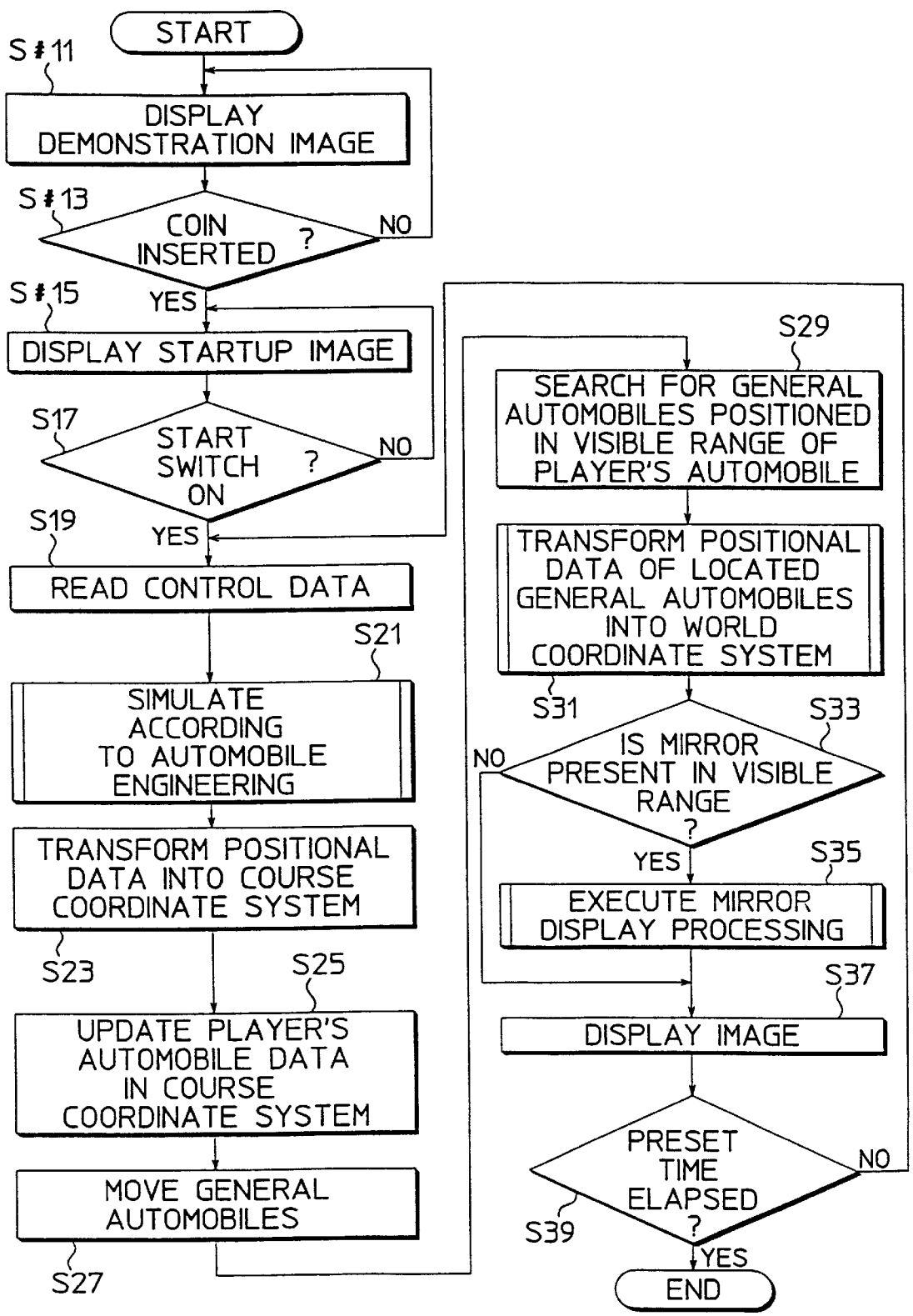
FIG. 8 is a flowchart of a main routine of an operation sequence of the driving game machine.

As shown in FIG. 8, when the driving game machine is switched on, the image display processor 256 displays a demonstration image on the display monitor 2 in a step S11. Then, the controller 25 determines whether a coin is inserted into the coin insertion slot 8 or not in a step S13. If not inserted (NO in the step S13), then the image display processor 256 continuously displays the demonstration image on the display monitor 2. If inserted (YES in the step S13), then the image display processor 256 displays a startup image on the display monitor 2 in a step S15.

Then, the controller 25 determines whether the start switch 9 is pressed or not in a step S17. If not pressed (NO in the step 17), then the image display processor 256 continuously displays the startup image on the display monitor 2. If pressed (YES in the step S17), then the driving game is initiated, and the game player operates the steering wheel 4, the accelerator pedal 5, the brake pedal 6, and the gear change lever 7 of the driving control assembly 22 to drive the player's automobile.

Various control data outputted from the driving control assembly 22 are supplied to the player's automobile control unit 255 in a step S19. The player's automobile control unit 255 effects a simulation process of simulating the player's automobile based on the automobile engineering according to the automobile behavior program stored in the ROM 23 in a step S21. Positional coordinate data of the player's automobile are produced by the player's automobile control unit 255 in the simulation process, and supplied to the course coordinate system transformation unit 253, which transforms the positional coordinate data into positional coordinate data in the course coordinate system (x, y) in a step S23.

Then, the positional data of the player's automobile in the position decision unit 259 are updated in a step S25. The general automobile control unit 257 effects a process of moving the general automobiles depending on the result determined by the movement decision unit 258 in a step S27. Then, the general automobile control unit 257 carries out a general automobile introduction process for introducing a predetermined number of general automobiles in a step S28.

Thereafter, the position decision unit 259 ascertains general automobiles that are positioned in the visible range of the player's automobile in a step S29. The world coordinate system transformation unit 254 transforms the positional coordinate data of the ascertained general automobiles from the course coordinate system (x, y) into the world coordinate system (X, Y, Z) according to a positional data transformation subroutine (described below) in a step S31.

Then, it is determined whether the mirror 13 is present in the visible range of the player's automobile in a step S33. If the mirror 13 is not present in the visible range (NO in the step S33), then control proceeds to a step S37. If the mirror 13 is present in the visible range (YES in the step S33), then the mirror display processor 250 effects a mirror display processing subroutine (described later on) in a step S35.

Thereafter, the image display processor 256 effects a three-dimensional image process on the positional coordinate data of the general automobiles which have been converted into the world coordinate system (X, Y, Z) and also the data about the position and direction of the player's automobile which have been produced in the simulation process in the step S21, and displays the player's automobile and the general automobiles on the display monitor 2 in the step S37. The image displaying process in the step 37 after the mirror 13 has been determined as being present in the visible range in the step S33 and the mirror display processing subroutine has been executed in the step S35 is described later on.

Then, the controller 25 determines whether a preset period of time has elapsed from the start of the driving game or not in a step S39. If not elapsed (NO in the step S39), then control returns to the step S19 to carry out the steps S19 through S39 to repeat the above running control process. If elapsed (YES in the step S39), then control comes to an end.

The driving game may be started when a coin is inserted through the coin insertion slot 8 rather than when the start switch 9 is pressed. The driving game may be finished when the player's automobile has run a predetermined number of laps around the circuit road 12 rather than when the preset period of time has elapsed.

Figure 9:
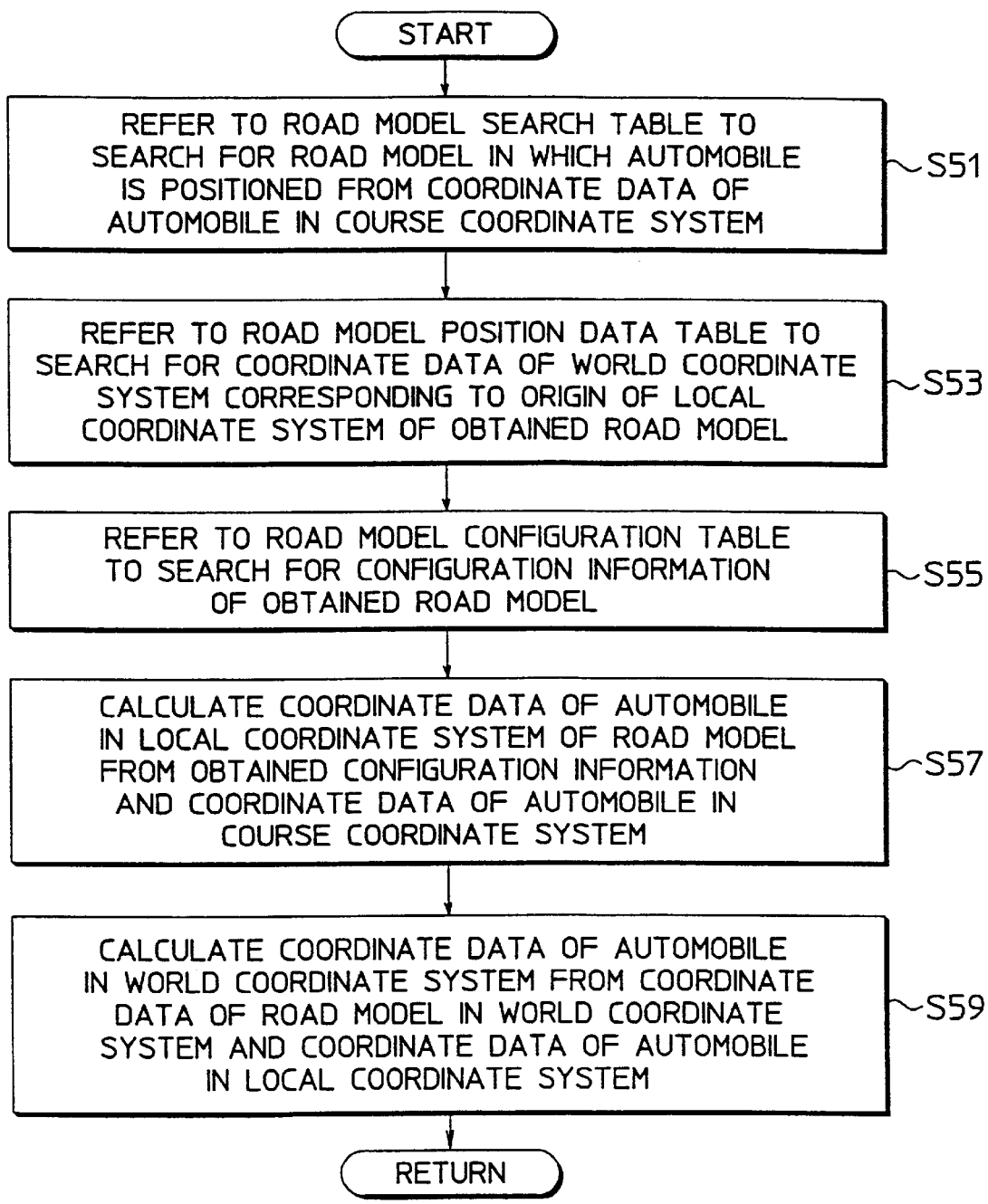
FIG. 9 is a flowchart of a positional data transformation subroutine in the main routine shown in FIG. 8.

FIG. 9 shows the positional data transformation subroutine in the step S31 in greater detail First, as shown in FIG. 9, the world coordinate system transformation unit 254 refers to a road model search table 1, partly shown below, to search for a road model in which a general automobile is positioned, from the coordinate data of the general automobile in the course coordinate system (x, y) in a step S51.

Road Model Search Table 1

| Distance (m) | Road model |
|---|---|
| 0~100 | (1) |
| 100~200 | (2) |
| 200~300 | (3) |
| 300~400 | (4) |
| 400~500 | (5) |
| 500~600 | (6) |
| 600~700 | (7) |
| 700~800 | (8) |
| . | . |
| . | . |
| . | . |

The road model search table 1, which is partly shown above, is stored in the ROM 23, and represents the association between the distance-related groups of the y coordinates of the straight road 120 (see FIG. 5) in the course coordinate system (x, y) and the road models of the straight road 120.

Thereafter, in a step S53, the world coordinate system transformation unit 254 refers to a road model position data table 2, partly shown below, to search for coordinate data in the world coordinate system (X, Y, Z) which correspond to the origin of the local coordinate system (x, y, z) that describes the road model obtained in the step S51.

Road Model Position Data Table 2

| Road Model | Position in world coordinate system |
|---|---|
| (1) | $(X_1, Y_1, Z_1)$ |
| (2) | $(X_2, Y_2, Z_2)$ |
| (3) | $(X_3, Y_3, Z_3)$ |
| (4) | $(X_4, Y_4, Z_4)$ |
| (5) | $(X_5, Y_5, Z_5)$ |
| (6) | $(X_6, Y_6, Z_6)$ |
| (7) | $(X_7, Y_7, Z_7)$ |
| (8) | $(X_8, Y_8, Z_8)$ |
| . | . |
| . | . |
| . | . |

The road model position data table 2, which is partly shown above, is stored in the ROM 23, and represents the positional relation between the local coordinate system (x, y, z) which describes the configuration information of each of the road models and the world coordinate system (X, Y, Z).

Then, in a step S55, the world coordinate system transformation unit 254 refers to a road model configuration table 3, partly shown below, to search for configuration information of the road model obtained in the step S51.

Road Model Configuration Table 3

Road Configuration Information

| Road Model | Lane | Shape | Center of Curvature | Radius of Curvature (m) | Siding Lane |
|---|---|---|---|---|---|
| (1) | 2→3 | Straight | — | — | Starting at oncoming lane |
| (2) | 3 | Straight | — | — | At oncoming lane |
| (3) | 3 | Straight | — | — | At oncoming lane |
| (4) | 3 | Left curve | $(x_4, y_4, z_4)$ | $r_4$ | At oncoming lane |
| (5) | 3 | Left curve | $(x_4, y_4, z_4)$ | $r_4$ | At oncoming lane |
| (6) | 2→3 | Straight | — | — | Ending at oncoming lane |
| (7) | 2 | Straight | — | — | — |
| (8) | 2→3 | Straight | — | — | Starting at oncoming lane |
| . | | | . | | |
| . | | | . | | |
| . | | | . | | |

The road model shape table 3, which is partly shown above, is stored in the ROM 23, and represents the information with respect to the configuration of each of the road models.

The information with respect to the configuration of each of the road models includes the number of lanes, the shape, i.e., straight, left curve (bend), or right curve (bend), and additionally the center and radius of curvature for left and right curves (bends) in the local coordinate system (x, y, z).

If a road model has a siding lane, then the road model shape table 3 further includes information as to whether the siding lane starts or ends or whether the siding lane is at the running lane or the oncoming lane. This information may be replaced with data with respect to the width of the road model, which provide data of a road edge.

Then, in a step S57, the world coordinate system transformation unit 254 calculates coordinate data of the automobile in the local coordinate system (x, y, z) of the road model from the coordinate data of the automobile in the course coordinate system (x, y) and the configurational information obtained in the step S55.

Finally, in a step S59, the world coordinate system transformation unit 254 calculates coordinate data of the automobile in the world coordinate system (X, Y, Z) from the coordinate data of the road model in the world coordinate system (X, Y, Z), which have been obtained in the step S53, and the coordinate data of the automobile in the local coordinate system (x, y, z), which have been obtained in the step S57.

Figure 10:
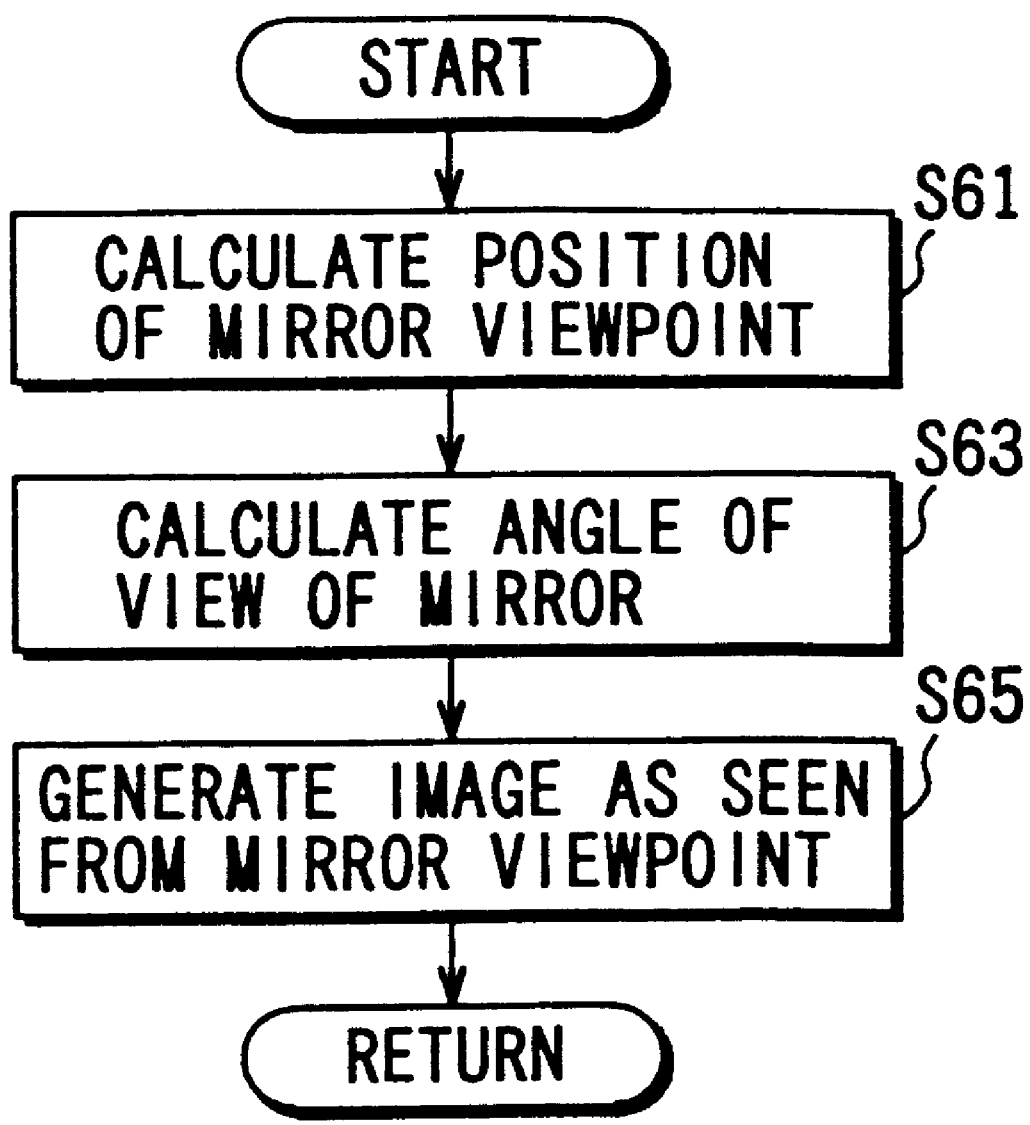
FIG. 10 is a flowchart of a mirror display processing subroutine in the main routine shown in FIG. 8.
Figure 11:
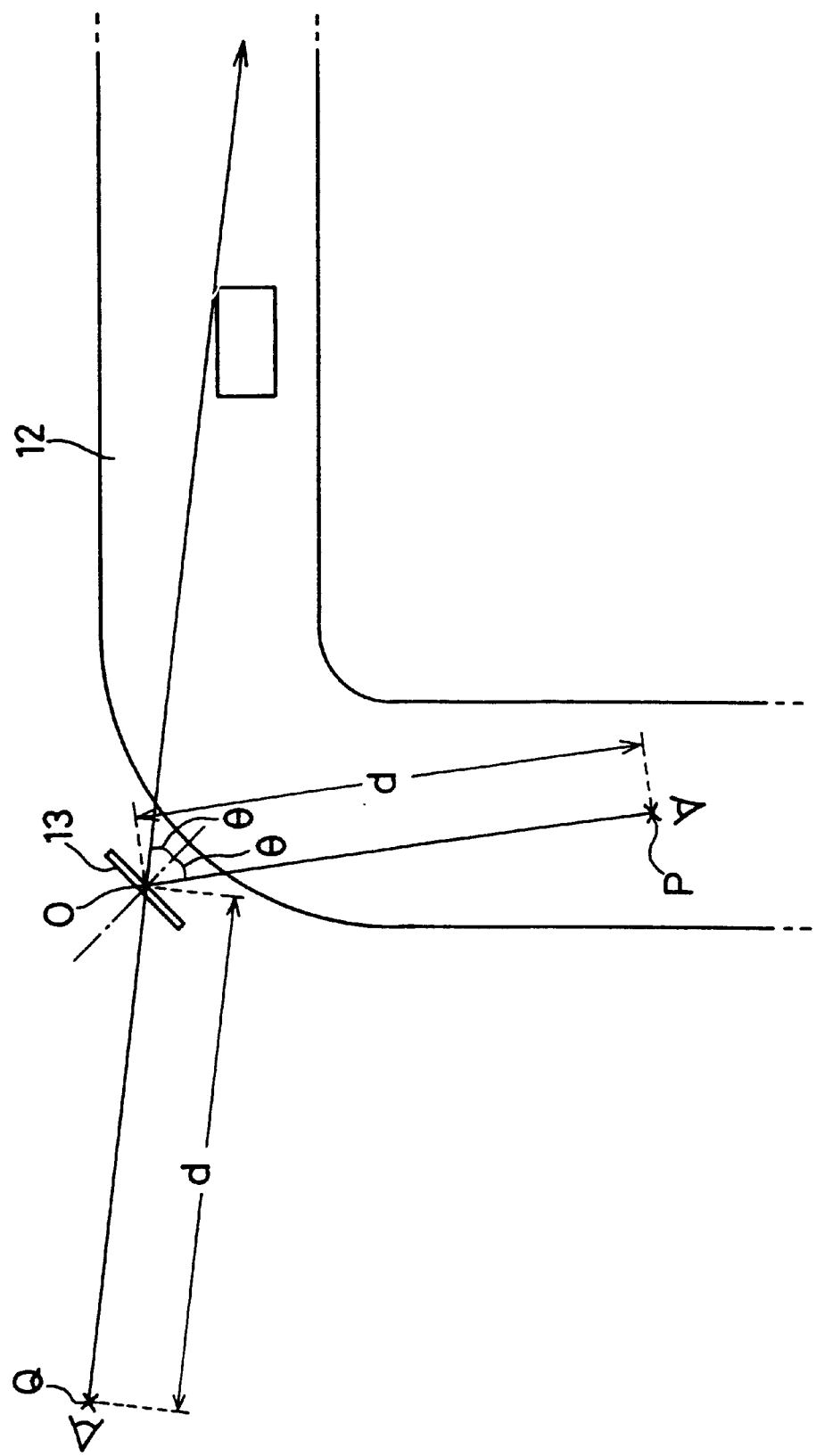
FIGS. 11, 12, and 13 are diagrams illustrative of the mirror display processing subroutine shown in FIG. 10.
Figure 12:
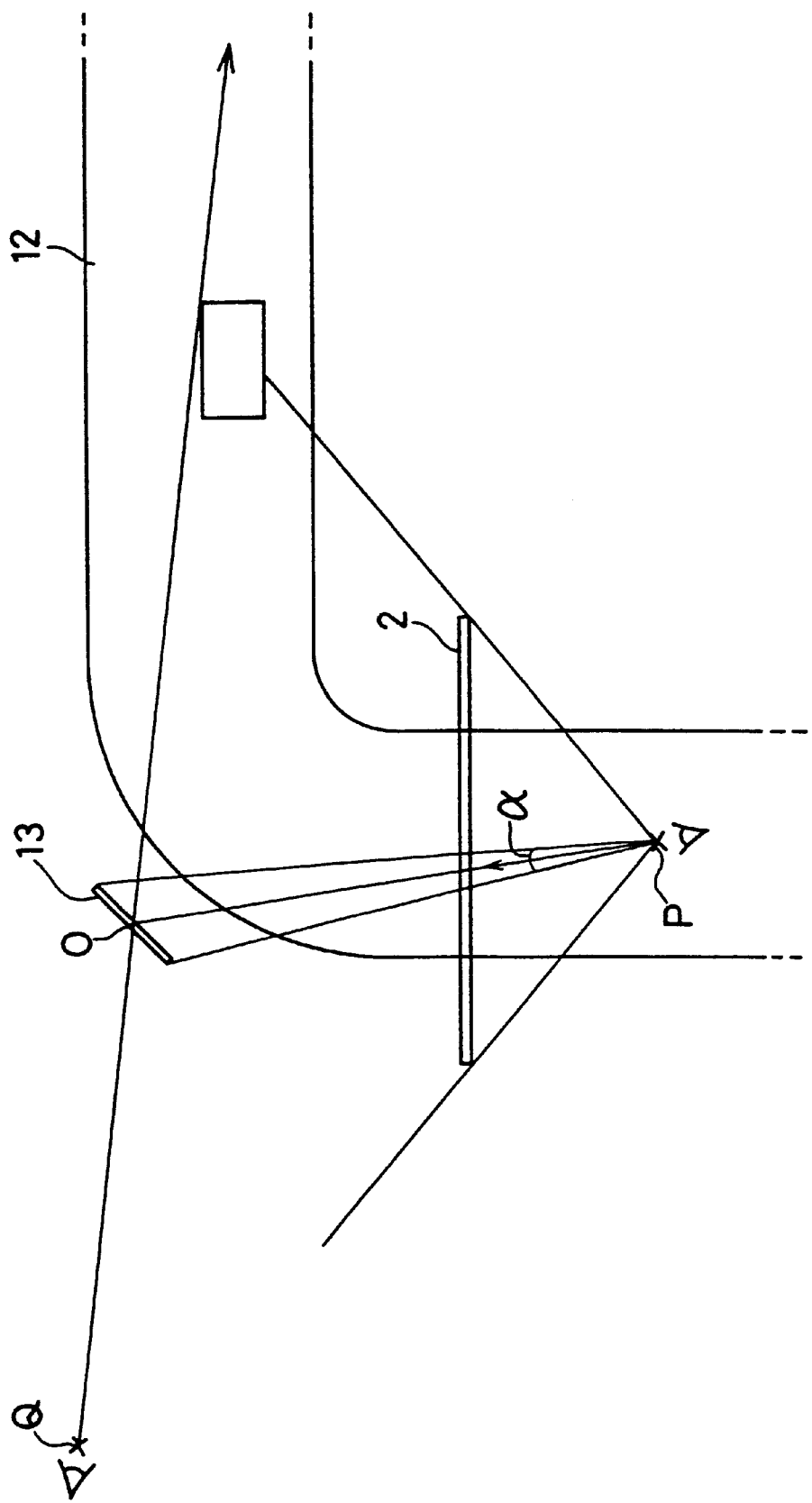
Figure 13:
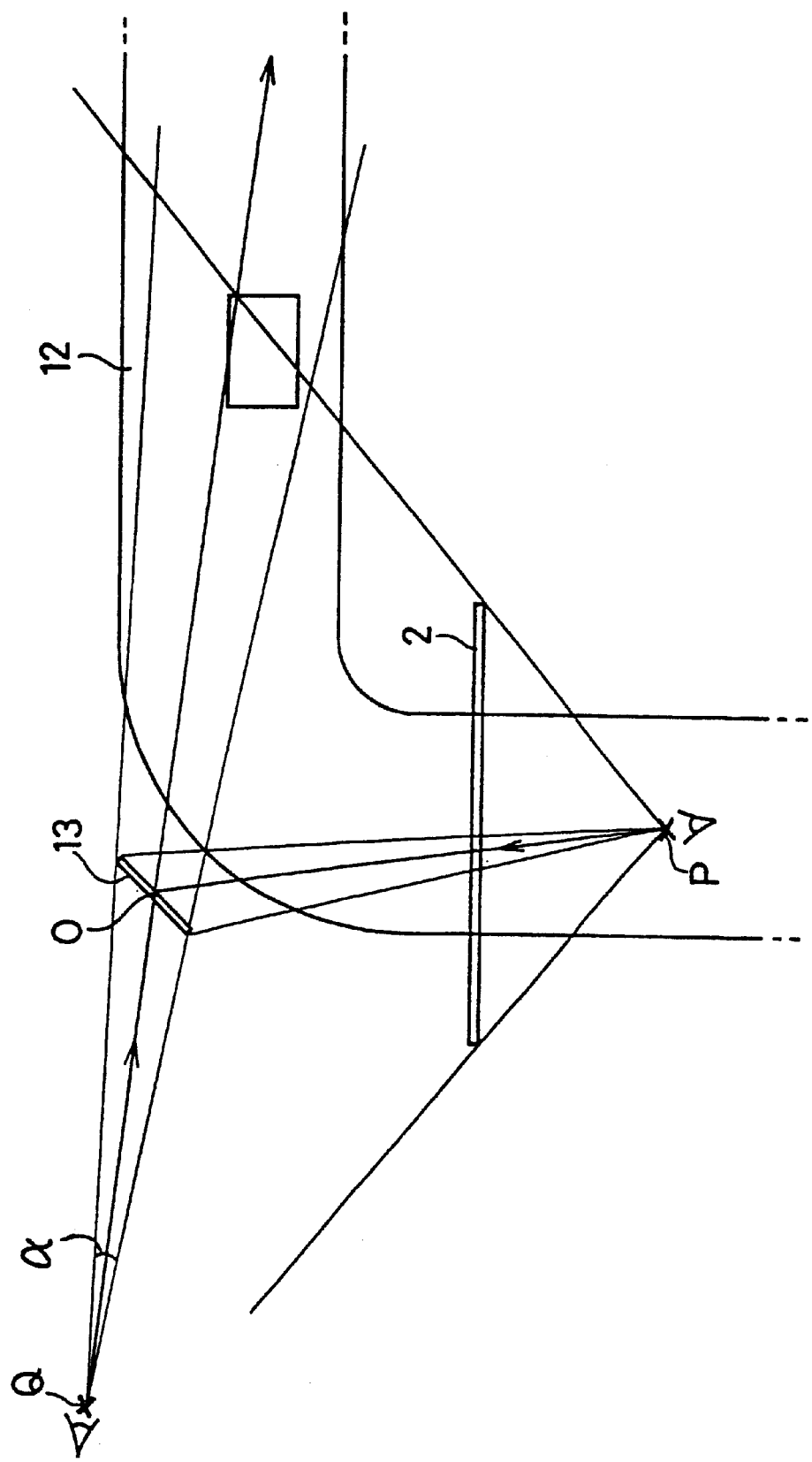

FIG. 10 shows the mirror display processing subroutine in the step S35 of the main routine shown in FIG. 8. FIGS. 11, 12, and 13 are diagrams illustrative of the mirror display processing subroutine shown in FIG. 10.

In the mirror display processing subroutine, the position of the player's automobile in the world coordinate system (X, Y, Z) will be referred to as a "viewpoint".

As shown in FIG. 11, the mirror display processor 250 calculates the direction of a line of sight from a viewpoint P toward a center O of the mirror 13 based on the coordinate data of the viewpoint P and the center O, and then calculates the direction of a reflected line of sight from the center O of the mirror 13, reflected at an exit angle θ on the mirror surface that is equal to an incident angle θ of the direction of the line of sight. The mirror display processor 250 also calculates the distance d between the center O of the mirror 13 and the viewpoint P. The mirror display processor 250 calculates coordinates of the position of a mirror viewpoint Q whereat a virtual image of the player's automobile would appear viewed from along the reflected line of sight and which is spaced the distance d from the center O of the mirror 13 in a direction opposite to the direction of the reflected line of sight in a step S61.

Then, as shown in FIG. 12, the mirror display processor 250 converts the mirror 13 established by the three-dimensional world coordinate system (X, Y, Z) and the viewpoint P represented by the world coordinate system (X, Y, Z) into data in the two-dimensional course coordinate system (x, y), and calculates the position and size of the mirror 13 on the display monitor 2 as viewed from the viewpoint P based on the converted data, thereby producing an angle α of view of the mirror 13 as seen from the viewpoint P in a step S63.

Thereafter, as shown in FIG. 13, the mirror display processor 250 determines an angle α of view of the mirror 13 as seen from the mirror viewpoint Q, and generates an image in the determined angle α of view of the mirror 13 as seen from the mirror viewpoint Q in a step S65.

The image displaying process in the step 37, after the mirror 13 has been determined as being present in the visible range in the step S33 and the mirror display processing subroutine has been executed in the step S35, described below with reference to FIGS. 14(a), 14(b), and 14(c).

Figure 14A:
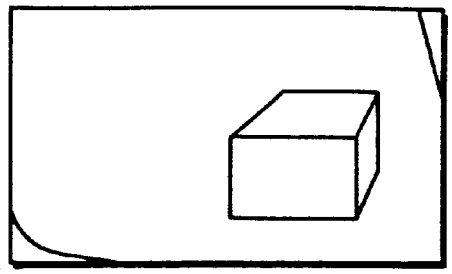
FIGS. 14(*a*), 14(*b*), and 14(*c*) are views showing a process of displaying a reflected image on a mirror at a bend.
Figure 14B:
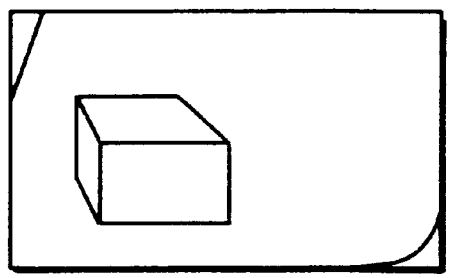
Figure 14C:
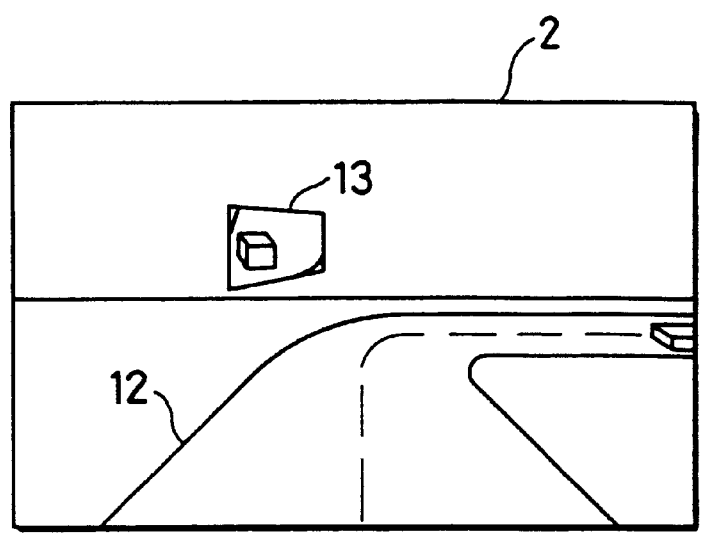

In the mirror display processing subroutine, the mirror display processor 250 generates an image in the determined angle α of view of the mirror 13 as seen from the mirror viewpoint Q, as shown in FIG. 14(a). Since an image reflected on the mirror 13 should be seen horizontally inverted, the image display processor 256 generates an image (see FIG. 14(b)) by horizontally inverting the generated image shown in FIG. 14(a), and then displays the generated image in superposed relation to the mirror 13 that is displayed on the display monitor 2, as shown in FIG. 14(c).

The reflected image which is seen as being reflected by the mirror 13, can easily be generated by determining the mirror viewpoint Q that is a counterpart of the viewpoint P with respect to the mirror 13. Since the angle α of view of the mirror 13 as seen from the viewpoint P, is calculated on the basis of the converted data in the in the two-dimensional course coordinate system (x, y), the reflected image on the mirror 13 can quickly be generated without an undue burden imposed on the CPU of the controller 25.

Accurate reflected images on the mirror 13 may be generated according to a ray tracing technique that is an image generating algorithm for computer graphics to trace light rays as they are reflected and attenuated for creating images. However, the ray tracing technique is difficult to apply to video game machines because it needs a high-speed calculating capability such as of a work station for real-time image display.

According to the present invention, reflected images on the mirror 13 can easily be generated in a short period of time without an increased calculating load on the controller 25.

The game player will be highly interested in playing the driving game machine as the game player is able to recognize general automobiles beyond a bend of the circuit road based on a reflected image on the mirror and take a preventive action to avoid a collision therewith before the player's automobile runs past the bend.

Two players can compete with each other in a driving game which is played using two driving game machines each identical to the driving game machine shown in FIG. 6.

The two driving game machines are connected to each other by a communication cable. To allow the two driving game machines to communicate with each other, the controller 25 of each of the driving game machines additionally has a communication control unit 26 which is indicated by the dot-and-dash lines in FIG. 6.

The communication control unit 26 in the controller 25 of one of the driving game machines transmits the coordinate data of the position of the player's automobile to the other driving game machine, and receives the player's automobile controlled by the other driving game machine, i.e., the coordinate data in the course coordinate system (x, y) of the rival automobile controlled by the other driving game machine, and sends the received coordinate data to the position decision unit 259.

The position decision unit 259 determines the positional relation between the player's automobile and the rival automobile and also the positional relation between the general automobiles and the rival automobile, and further determines the rival automobile which is positioned in the preset visible range of the player's automobile. When the position decision unit 259 determines a contact or collision between the player's automobile and the rival automobile, it delivers a collision signal to the image display processor 256.

The movement decision unit 258 determines whether the rival automobile exists in front of the same lane as the player's automobile or not. When the position decision unit 259 determines that the rival automobile is positioned in the visible range of the player's automobile, the world coordinate system transformation unit 254 transforms the positional coordinate data of the rival automobile from the course coordinate system (x, y) into the world coordinate system (X, Y, Z). The image display processor 256 displays the rival automobile whose positional coordinate data have been transformed into the world coordinate system (X, Y, Z) on the display monitor 2.

As described above, the communication control units 26 in the controllers 25 of the two driving game machines exchange the positional data of the player's automobiles controlled by the respective driving game machines. Therefore, the players of the two driving game machines can compete with each other in a driving game jointly played on the driving game machines, and will find the driving game much more interesting.

Because the positional data of the rival automobile are handled as the two-dimensional coordinate data in the course coordinate system (x, y), the position decision unit 259 can easily and quickly determine the positional relations and whether the rival automobile in the visible range of the player's automobile.

Various changes or modifications may be made in the illustrated embodiment of the driving game machine according to the present invention as follows:

(1) The communication control unit 26 may transmit the positional coordinate data of the player's automobile in the world coordinate system (X, Y, Z) which have been obtained by the player's automobile control unit 255, and also receive the positional coordinate data of the player's automobile in the world coordinate system (X, Y, Z) which is controlled by another driving game machine. In such a modification, the course coordinate system transformation unit 253 transforms the received positional coordinate data into the course coordinate system (x, y), and then delivers the transformed positional coordinate data to the position decision unit 259.

(2) The interconnected driving game machines need not have their own individual controllers 25, but may be controlled by a single controller 25 in a centralized control system that governs all the driving game machines. In this modified arrangement, the single controller 25 does not need any communication control unit 26, but has course coordinate system processors 252 associated respectively with the driving game machines. The single controller 25 also has the course coordinate system processor 252, the course coordinate system transformation unit 253, and the world coordinate system transformation unit 254 for carrying out the same decision and transformation processes as described above.

(3) Three or more driving game machines may be interconnected through their respective communication control units 26. In such a modification, the positional data of rival automobiles are handled as coordinate data in the two-dimensional course coordinate system (x, y), so that the position decision unit 259 can easily and quickly determine the positional relations and the rival automobiles in the visible range of the player's automobile. Therefore, the number of rival automobiles involved in a driving game played jointly on the driving game machines increases to the point where the players will be excited by the driving game as they compete with many other rival automobiles simultaneously all the way during the driving game.

(4) The communication control unit 26 may be replaced with a rival automobile control unit for controlling the running of a rival automobile with preset capabilities, and the driving game machine may not be connected to another driving game machine. According to this modification, the player of the driving game machine can compete with a rival automobile all by himself, and can still enjoy a competitive driving game.

(5) In transforming the positional coordinate data of general automobiles in the subroutine shown in FIG. 9, at a curve (bend) of the circuit road 12, an automobile running on an inner lane along the curve may slightly be decelerated, and an automobile running on an outer lane along the curve may slightly be accelerated, thereby compensating for the difference between speeds on the straight road 120 and the circuit road 12.

(6) In FIG. 4, the circuit road 12 may be divided into longer road models in a straight section thereof and shorter road models in a curve section thereof, so that these road models may have different distances or lengths. In this manner, the number of road models of the circuit road 12 may be reduced.

(7) The circuit road 12 may be divided into a plurality of blocks, data of the world coordinate system as to the width of the circuit road 12 for each of the blocks may be stored in the ROM 23, and a collision between the player's automobile and a road edge may be determined for each of the blocks by the player's automobile control unit 255 of the world coordinate system processor 251, rather than the position decision unit 259 of the course coordinate system processor 252. When the player's automobile control unit 255 decides that such a collision has occurred, the player's automobile control unit 255 may send a collision signal to the image display processor 256. Accordingly, a collision can easily be determined with respect to any road widths simply by storing road width data of the respective blocks into the ROM 23.

(8) As shown in FIG. 4, the circuit road 12 basically comprises two lanes, i.e., a running lane and an oncoming lane, except for siding lanes. Either one or both of the running and oncoming lanes may comprise a plurality of lanes to make the driving game more complex and interesting.

(9) The ROM 23 may be in the form of a removable recording medium such as a CD-ROM, an optical disk, a memory card, a floppy disk, or the like for replacing or updating the game program.

Although a certain preferred embodiment of the present invention has been shown and described in detail, it should be understood that various changes and modifications may be made therein without departing from the scope of the appended claims.

What is claimed is:

1. A driving game machine for simulating driving a player's automobile on a display monitor, comprising:

image display processing means for displaying on the display monitor a real-time three-dimensional image of a game space varying in accordance with the player's automobile running on a three-dimensional road established in a three-dimensional coordinate system in the game space;

driving control input means, operable by a game player, for receiving input from the game player directing the player's automobile on the three-dimensional road;

player's automobile control means for controlling the player's automobile to run on the three-dimensional road in response to said driving control input means;

mirror coordinate data memory means for storing coordinate data of a mirror in the three-dimensional coordinate system proximate said three-dimensional road such that an image of the three dimensional road is reflectable by the mirror; and mirror display processing means for displaying the mirror on the display monitor based on the coordinate data stored by said mirror coordinate data memory means;

said mirror display processing means comprising:

player's automobile coordinate determining means for determining coordinate data of the player's automobile controlled by said player's automobile control means;

line-of-sight calculating means for calculating a direction of a line-of-sight from a viewpoint of the player's automobile toward the mirror based on the coordinate data of the mirror and the coordinate data of the player's automobile;

distance calculating means for calculating a distance from the player's automobile to the mirror based on the coordinate data of the mirror and the coordinate data of the player's automobile;

reflected line-of-sight calculating means for calculating a direction of a reflected line-of-site from the mirror based on an angle between a reflecting surface of the mirror obtained from coordinate data of the mirror and said direction of the line-of-site;

mirror viewpoint coordinate calculating means for calculating coordinates of a viewpoint of the mirror which is spaced said distance from the mirror in a direction opposite to said direction of the reflected line-of-site;

an angle-of-view calculating means for calculating a size of the mirror displayed on the display monitor based on the coordinate data of the mirror and the coordinate data of the player's automobile, and subsequently calculating an angle-of-view of the mirror as viewed from said viewpoint of the player's automobile based on the calculated size of the mirror; and image generating means for generating an image within said angle-of-view as viewed from said viewpoint of the mirror in said direction of the reflected line-of-sight; and said image display processing means comprising means for horizontally inverting said image generated by said image generating means and displaying the horizontally inverted image in superposed relation to said mirror on the display monitor.

2. A driving game machine according to claim 1, wherein said angle-of-view calculating means comprises:

means or calculating in a two-dimensional coordinate system the size of said mirror displayed on the display monitor based on two-dimensional coordinates obtained from the coordinate data of the mirror and the coordinate data of the player's automobile, and means for calculating in the two-dimensional coordinate system the angle-of-view of the mirror as viewed from said viewpoint of the player's automobile based on the calculated size of the mirror.

3. A driving game machine according to claim 1 or 2, further comprising:

general automobile control means for controlling a plurality of general automobiles to run on said three-dimensional road;

said three-dimensional road having a running lane and an oncoming lane for the player's automobile and said general automobiles to run therealong; and said image display processing means comprising means for displaying said general automobiles in the running lane traveling in the same direction as said player's automobile and for displaying said general automobiles in the oncoming lane traveling in a direction opposite to said player's automobile.

4. A recording medium storing a driving game program in executable code for enabling a computer to to simulate on a display monitor driving of a player's automobile on a three-dimensional road established in a three-dimensional coordinate system in a game space in response to input by a game player, wherein said driving game program controls said computer to execute the steps of:

displaying on the display monitor a real-time three-dimensional image of a game space varying in accordance with the player's automobile traveling on said three dimensional road, said three-dimensional image including a mirror proximate said three-dimensional road and established in the three-dimensional coordinate system such that an image of said three-dimensional road is reflectable in said mirror; and displaying a reflected image in superposed relation to the mirror such that the reflected image appears in the mirror;

said step of displaying the reflected image comprising the steps of:
 determining coordinate data of the player's automobile;
 calculating the direction of a line-of-sight from a viewpoint of the player's automobile toward the mirror based on the coordinate data of the mirror and the coordinate data of the player's automobile in the three-dimensional coordinate system;
 calculating a distance from the player's automobile to the mirror based on the coordinate data of the mirror and the coordinate data of the player's automobile;
 calculating the direction of a reflected line-of-sight from the mirror based on an angle between a reflecting surface of the mirror obtained from coordinate data of the mirror and said direction of the line-of-sight;
 calculating coordinates of a viewpoint of the mirror which is spaced said distance from the mirror in a direction opposite to said direction of the reflected line-of-sight;
 calculating a size of the mirror displayed on the display monitor based on the coordinate data of the mirror and the coordinate data of the player's automobile, and subsequently calculating an angle-of-view of the mirror as viewed from said viewpoint of the player's automobile based on the calculated size of the mirror;
 generating an image within said angle-of-view as viewed from said viewpoint of the mirror in said direction of the reflected line-of-sight over at most said distance; and
 horizontally inverting said image generated within said angle-of-view and displaying the horizontally inverted image in superposed relation to said mirror.

5. A method of displaying a three-dimensional image in a driving game machine for simulating driving a player's automobile on a display monitor, comprising the steps of:

displaying on the display monitor a real-time three-dimensional image of a game space varying in accordance with the player's automobile running on a three-dimensional road established in a three-dimensional coordinate system in the game space;

calculating the direction of a line-of-sight from a viewpoint of the player's automobile toward a mirror positioned proximate said three-dimensional road and established in the three-dimensional coordinate system such that an image of the three-dimensional road is reflectable in the mirror, based on coordinate data of the mirror and coordinate data of the player's automobile in the three-dimensional coordinate system;

calculating a distance from the player's automobile to the mirror based on the coordinate data of the mirror and the coordinate data of the player's automobile;

calculating the direction of a reflected line-of-sight from the mirror based on an angle between a reflecting surface of the mirror obtained from coordinate data of the mirror and said direction of the line-of-sight;

calculating coordinates of a viewpoint of the mirror which is spaced said distance from the mirror in a direction opposite to said direction of the reflected line-of-sight;

calculating a size of the mirror displayed on the display monitor based on the coordinate data of the mirror and the coordinate data of the player's automobile, and subsequently calculating an angle-of-view of the mirror as viewed from said viewpoint of the player's automobile based on the calculated size of the mirror; and generating an image within said angle-of-view as viewed from said viewpoint of the mirror in said direction of the reflected line-of-sight;

displaying in the real-time three-dimensional image of the game space the mirror, horizontally inverting said image generated within said angle of view, displaying the horizontally inverted image in superposed relation to said mirror.

6. A driving game machine for displaying a realtime image which varies as a simulated player's automobile runs on a road in a game space, comprising:

game space image generating means for generating an image of the road with a bend and a mirror positioned stationary relative the road so as to be positioned for reflecting an image of the road around the bend;

virtual-image-position calculating means for calculating the position of a virtual image of the player's automobile which is produced by the mirror when viewed from the road around the bend;

mirror view image generating means for generating an image in a range of view of the mirror as viewed from the position of the virtual image of the player's automobile;

and image display processing means for displaying an image, which is horizontally inverted from the image generated by said mirror view image generating means, superposed over the mirror in the real-time image.

7. The driving game machine according to claim 1, wherein said coordinate data of said mirror is fixed relative said coordinate data of said three-dimensional road.

8. The recording medium according to claim 4, wherein said coordinate data of said mirror is fixed relative said coordinate data of said three-dimensional road.

9. The method according to claim 5, wherein said coordinate data of said mirror is fixed relative said coordinate data of said three-dimensional road.

10. A method of simulating traveling in a vehicle on a road having a bend comprising the steps of:

displaying a view of the road varying in accordance with a vehicle viewpoint position of the vehicle traveling on the road as the vehicle approaches the bend;

displaying in the view a mirror positioned relative to the bend in said road such that an image of a portion the road around the bend is reflectable to the vehicle viewpoint; and displaying a horizontal inversion the image of the portion of the road reflectable to the vehicle viewpoint in the mirror.

11. The method of claim 10 wherein the step of displaying the horizontal inversion includes:

determining the position of a mirror viewpoint of the mirror of the portion of the road around the bend based on a position of the vehicle relative to the mirror;

generating image data representing the image of the portion of the road around the bend from the perspective of the mirror viewpoint; and horizontally inverting the image data to produce the horizontal inversion.

* * * * *